United States Patent
Hiraga et al.

(10) Patent No.: US 7,978,221 B2
(45) Date of Patent: Jul. 12, 2011

(54) METHOD AND APPARATUS FOR CAPTURING AN IMAGE

(75) Inventors: Masaki Hiraga, Tokyo (JP); Kensuke Habuka, Tokyo (JP)

(73) Assignee: Morpho, Inc., Tokyo (JP)

( * ) Notice: Subject to any disclaimer, the term of this patent is extended or adjusted under 35 U.S.C. 154(b) by 391 days.

(21) Appl. No.: 12/321,937

(22) Filed: Jan. 27, 2009

(65) Prior Publication Data

US 2009/0190013 A1 Jul. 30, 2009

(30) Foreign Application Priority Data

Jan. 29, 2008 (JP) ................................. 2008-018376

(51) Int. Cl.
| | |
|---|---|
| H04N 5/228 | (2006.01) |
| H04N 5/217 | (2011.01) |
| H04N 3/14 | (2006.01) |
| H04N 5/335 | (2011.01) |

(52) U.S. Cl. ................ 348/208.12; 348/208.4; 348/241; 348/296

(58) Field of Classification Search ............. 348/208.99, 348/208.1, 208.4, 208.6, 208.12, 208.13, 348/241, 248, 296; 382/107

See application file for complete search history.

(56) References Cited

U.S. PATENT DOCUMENTS

| | | | | |
|---|---|---|---|---|
| 2006/0188021 | A1* | 8/2006 | Suzuki et al. | 375/240.16 |
| 2007/0120997 | A1* | 5/2007 | Sasaki et al. | 348/362 |
| 2008/0030587 | A1* | 2/2008 | Helbing | 348/208.4 |

FOREIGN PATENT DOCUMENTS

| | | |
|---|---|---|
| JP | 2004-363869 | 12/2004 |
| JP | 2006-074678 | 3/2006 |
| JP | 2006-148496 | 6/2006 |
| JP | 2007-142587 | 6/2007 |
| JP | 2007-208580 | 8/2007 |
| JP | 2007-235819 | 9/2007 |
| JP | 2009089037 A * | 4/2009 |

* cited by examiner

*Primary Examiner* — Sinh Tran
*Assistant Examiner* — Daniel M Pasiewicz
(74) *Attorney, Agent, or Firm* — Muramatsu & Associates

(57) ABSTRACT

A method for capturing an image using an image capturing module with multiple pixels configured in a 2-dimensional matrix and a focal plane electronic shutter function which sequentially slides the exposure timing by constant interval by pixel group which is a unit of predetermined number of the pixels while scanning; the method includes an image data input process for detecting shutter operation, obtaining a reference image while skipping one or more of the pixel groups by sequentially sliding the exposure timing by the constant interval, and obtaining a target image while not skipping pixel groups to be captured, a motion data detection process for calculating the motion data of the target image based on the reference image, and a distortion compensation process for compensating for distortion in the target image according to the motion data.

4 Claims, 8 Drawing Sheets

FIG.8
(a)
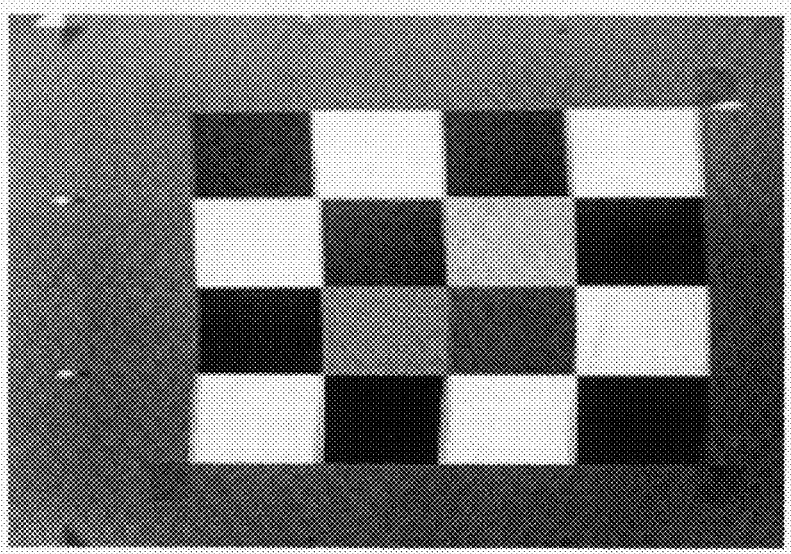
(b)
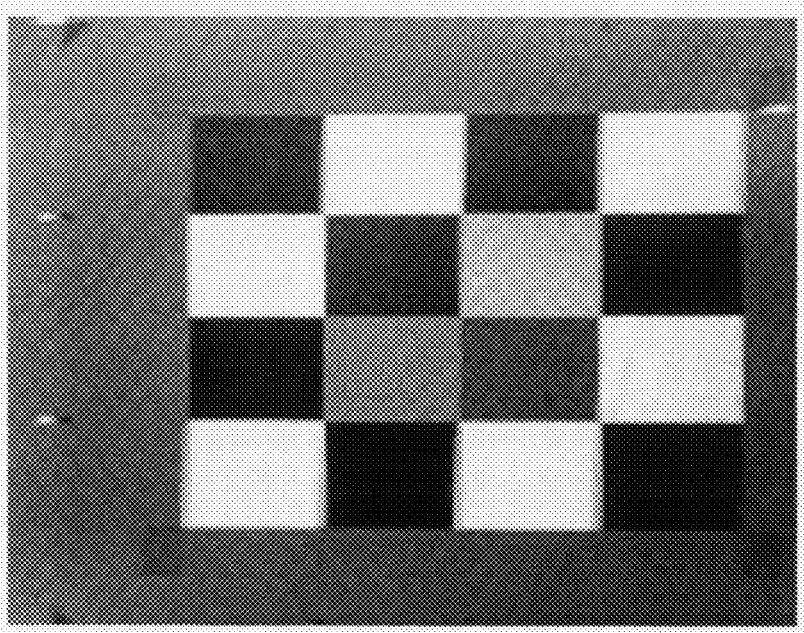

METHOD AND APPARATUS FOR CAPTURING AN IMAGE

BACKGROUND OF THE INVENTION

1. Field of the Invention

The present invention relates to image capturing method and image capturing apparatus that compensates for distortions from such causes as camera-shake in an image captured by an image capturing device equipped with a CMOS type image capturing module, and creates a high quality distortion-compensated image.

2. Description of the Related Art

In recent years, image capturing module based on CMOS (Complementary Metal Oxide Semiconductor) sensors, which is smaller and requires less power compared to CCD (Charge Coupled Device), have been utilized in image capturing devices such as mobile phones and digital cameras.

However, in a CMOS sensor image capturing module the focal plane electronic shutter system, which exposes and scans individual pixels and accumulated charges are output sequentially, is often used instead of the global electronic shutter system such as a CCD which simultaneously transfers every pixel charge accumulated for an entire image when an electronic shutter has been operated.

Therefore, in a CMOS sensor, the timing of the output signal becomes delayed depending on the output electrical charge, which can cause an image to be distorted in the direction of the scan if camera-shake occurs during scanning.

For existing technologies that compensate this image distortion, Patent Documents 1 and 2 propose technologies that utilize gyro sensors to detect camera-shake and compensate captured images. Also, Patent Document 3 proposes circuitry design that allow full screen simultaneous image capturing on a CMOS sensor. However, these technologies require additional circuitry which is costly.

Also, Patent Documents 4 through 6 propose technologies that compensate for distortions in images captured using focal plane electronic shutter system with software processing where the correlation with the previous frame or adjoining horizontal groups is computed, or interpolation is performed based on the preceding and succeeding frames. However, these methods require heavy CPU load, and they have limited accuracy in their compensation when a captured image is blurred at the time of it being captured.

Patent Document 1: Japanese Unexamined Patent Application Publication No. 2007-235819
Patent Document 2: Japanese Unexamined Patent Application Publication No. 2006-074678
Patent Document 3: Japanese Unexamined Patent Application Publication No. 2007-142587
Patent Document 4: Japanese Unexamined Patent Application Publication No. 2007-208580
Patent Document 5: Japanese Unexamined Patent Application Publication No. 2006-148496
Patent Document 6: Japanese Unexamined Patent Application Publication No. 2004-363869

SUMMARY OF THE INVENTION

With the above circumstances taken into consideration, the object of the present invention is to provide a method and an apparatus for capturing an image that can create a high quality image at a low cost by reducing the CPU load associated with software image distortion-compensation for an image captured using a focal-plane electronic shutter system.

In order to achieve the object, there is provided according to an aspect of the present invention, a method for capturing an image using an image capturing module with multiple pixels configured in a 2-dimensional matrix and a focal plane electronic shutter function which sequentially slides the exposure timing by constant interval by pixel group which is a unit of predetermined number of the pixels while scanning, the method includes an image data input process for detecting shutter operation, obtaining a reference image while skipping one or more of the pixel groups by sequentially sliding the exposure timing by the constant interval, and obtaining a target image while not skipping pixel groups to be captured, a motion data detection process for calculating the motion data of the target image based on the reference image, and a distortion compensation process for compensating for distortion in the target image according to the motion data.

The present invention sequentially captures an image in the pixel skip mode where pixel groups are skipped according to shutter operation, and captures at least one image in normal mode where any pixel group is not skipped. At this time, the pixel skip mode does not simply only skip pixel groups, but pixel groups are skipped by maintaining the difference in the exposure timing of each pixel group to be captured. The order of image capture in each mode does not matter. If the pixel signal readout time is short due to pixel skipping, the exposure timing lag can be shortened in the pixel skip mode. The distortion of an image captured in normal mode can be compensated with less CPU load by obtaining a less distorted image using the pixel skip mode while regulating the exposure timing time lag so it does not exceed that of the normal mode, this image is used to compute the motion of the image captured in normal mode, and this motion data is used to compensate the image captured in normal mode.

Also, a sharper image can be synthesized by compensating both the image blur from camera shake and image distortion from the focal plane electronic shutter system by executing an image synthesizing process that synthesizes together multiple distortion compensated images that have been compensated by executing the motion data detection process and the distortion compensation process to each target image by obtaining multiple target images. The smoothing of image quality by synthesizing multiple target images together is especially useful for a CMOS sensor since it contains random noise or fixed pattern noise.

In the motion data detection process, "based on the reference image" does not distinguish between direct and indirect comparisons. For example, this includes cases where each target image is compared to a reference image, as well as cases where a target image whose distortion was compensated by comparing it to a reference image is used as a new reference image and this new reference image is used to compare to each target image to compensate their distortion. For the latter case, a higher resolution matching process becomes possible compared to the former case; therefore, motion data computation can be more accurate. Also, reference image and target image are relative terms; here an image to be compensated is a target image.

Also, there is provided according to this invention, an image capturing apparatus with multiple pixels configured in a 2-dimensional matrix and a focal plane electronic shutter function which sequentially slides the exposure timing by constant interval by pixel group which is a unit of predetermined number of the pixels while scanning; the image capturing apparatus captures multiple image data in a single shutter operation, including a timing generation unit that has a pixel skip mode where one or more of the pixel groups are skipped while scanning by sequentially sliding the exposure timing by the constant interval and a normal mode where each group to be captured is sequentially scanned without pixel skipping; the timing generation unit detects shutter operation and outputs an operation signal to an image capturing module according to each of the modes, an image data input unit to obtain multiple image data including image data from the image skip mode and image data from the normal mode, an input image data storage unit to store an image data captured in pixel skip mode as reference image and image data captured in normal mode as target images, a size adjustment unit to match the sizes of the reference image and the target images, a motion data detection unit to calculate the motion data between the reference image and each of its multiple target images by executing a block matching process after matching the size of a reference image and a target image using the size adjustment unit, a distortion compensation unit to compensate each distortion in a target image stored in the input data storage unit according to the motion data detected by the motion data detection unit, an image synthesizing unit to create an image by synthesizing an image which had its distortion compensated by the distortion compensation unit.

In order to detect the motion of a target image against a reference image, the present invention executes block matching process after converting the size of the reference image and the target image to be the same. Size conversion can be attained through such processes as removing each pixel of a target image that match with the pixels that were skipped while capturing the reference image, or by simple image size shrinking to match the size of a target image to the reference image, or through other methods such as the bilinear method or the bicubic method to expand the size of a reference image to the size of the target image. And, if the target image size was shrunk to match the reference image size, a blur-compensated image is created by blending distortion-compensated images together after converting the motion data so that it matches the original image size (target image before size adjustment).

A higher quality synthesized image can be created by obtaining the motion data between a reference image and the first target image, compensating for the distortion of the target image at its original size, and using this compensated image as the new reference image to compute the motion data with other target images.

According to the present invention, distortion-compensation for an image captured using focal plane shutter system can be achieved by capturing images respectively in pixel skip mode and in normal mode in a single shutter operation, computing motion data using the less distorted image captured in pixel skip mode as the reference image, and using this motion data to compensate the image captured in normal mode. Also, a sharper image that is also given blur-compensation for camera shake can be obtained by capturing an image in pixel skip mode and multiple images in normal mode in a single shutter operation, creating a distortion-compensated image for each of the images captured in normal mode, and blending these distortion-compensated images together to create a synthesized image.

BRIEF DESCRIPTION OF THE DRAWINGS

FIG. 8 shows the same image before and after the distortion compensation.

DESCRIPTION OF THE PREFERRED EMBODIMENTS

Figure 1:
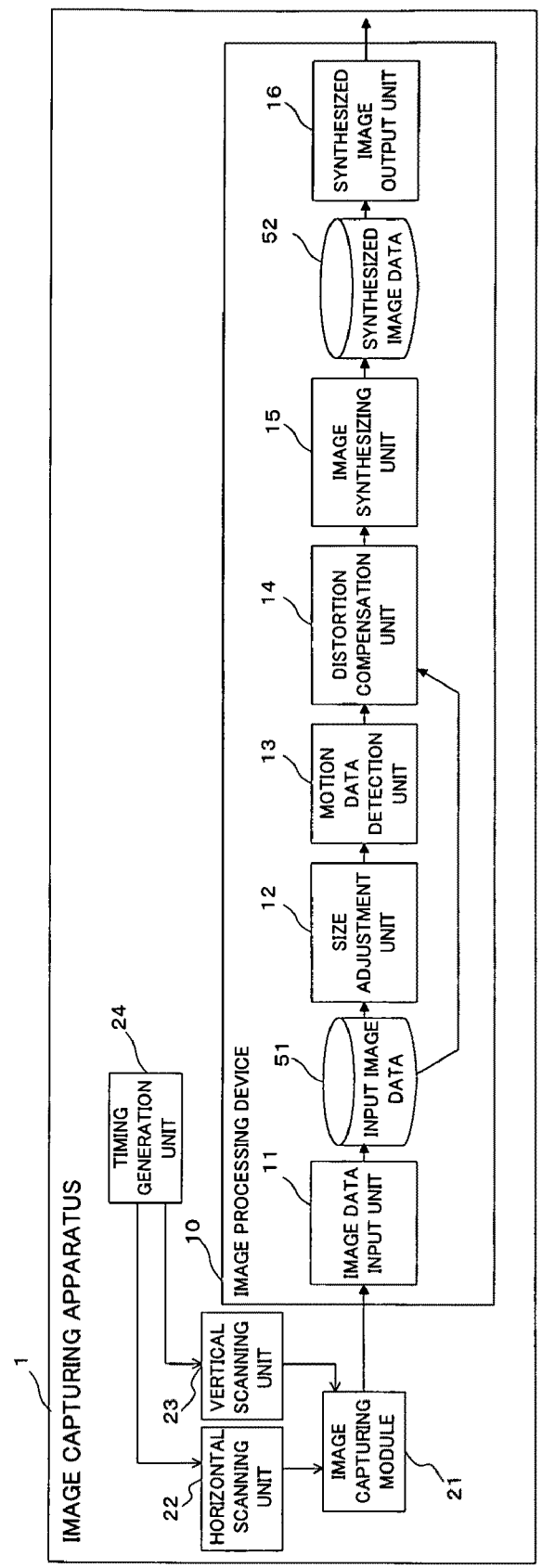
FIG. 1 is a block diagram for the image capturing apparatus in this embodiment of the present invention.

Preferred embodiments in accordance with this invention will be described below. FIG. 1 is a functional block diagram of the image capturing apparatus of this embodiment. Image capturing apparatus 1 includes CMOS type image capturing module 21 which contains multiple pixels in a 2-dimensional matrix, horizontal scanning unit 22 to output scanning signal in the horizontal direction, vertical scanning unit 23 to output scanning signal in the vertical direction, timing generation unit 24 to output timing signals to horizontal scanning unit 23 and vertical scanning unit 24, and image processing device 10 to process image data obtained via image capturing module 21.

Image processing device 10 includes image data input unit 11 to input image data captured by image capturing module 21, input image data storage unit 51 to store input image data, size adjustment unit 12 to adjust the size of input image data, motion data detection unit 13 to compute motion data such as affine parameters or motion vectors based on resized image data, distortion compensation unit 14 to compensate for distortion in input image data by using motion data, image synthesizing unit 15 to blend together distortion compensated images to create a synthesized image, synthesized image data storage unit 52 to store a synthesized image, and synthesized image output unit 16 to output a synthesized image. Each unit 11 to 16 can be implemented as a program on a CPU.

(Image Data Input Process)

Figure 2:
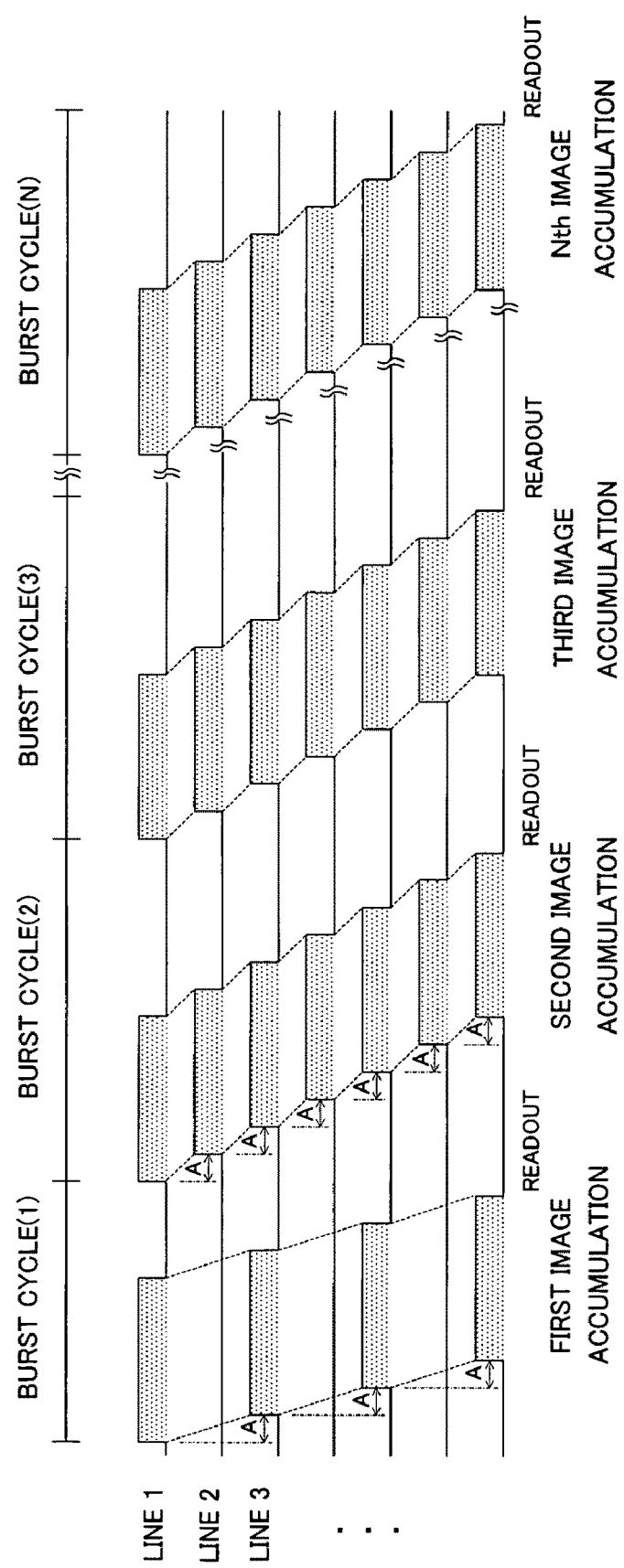
FIG. 2 is a scanning signal timing chart for timing generation unit 24 of FIG. 1.
Figure 3:
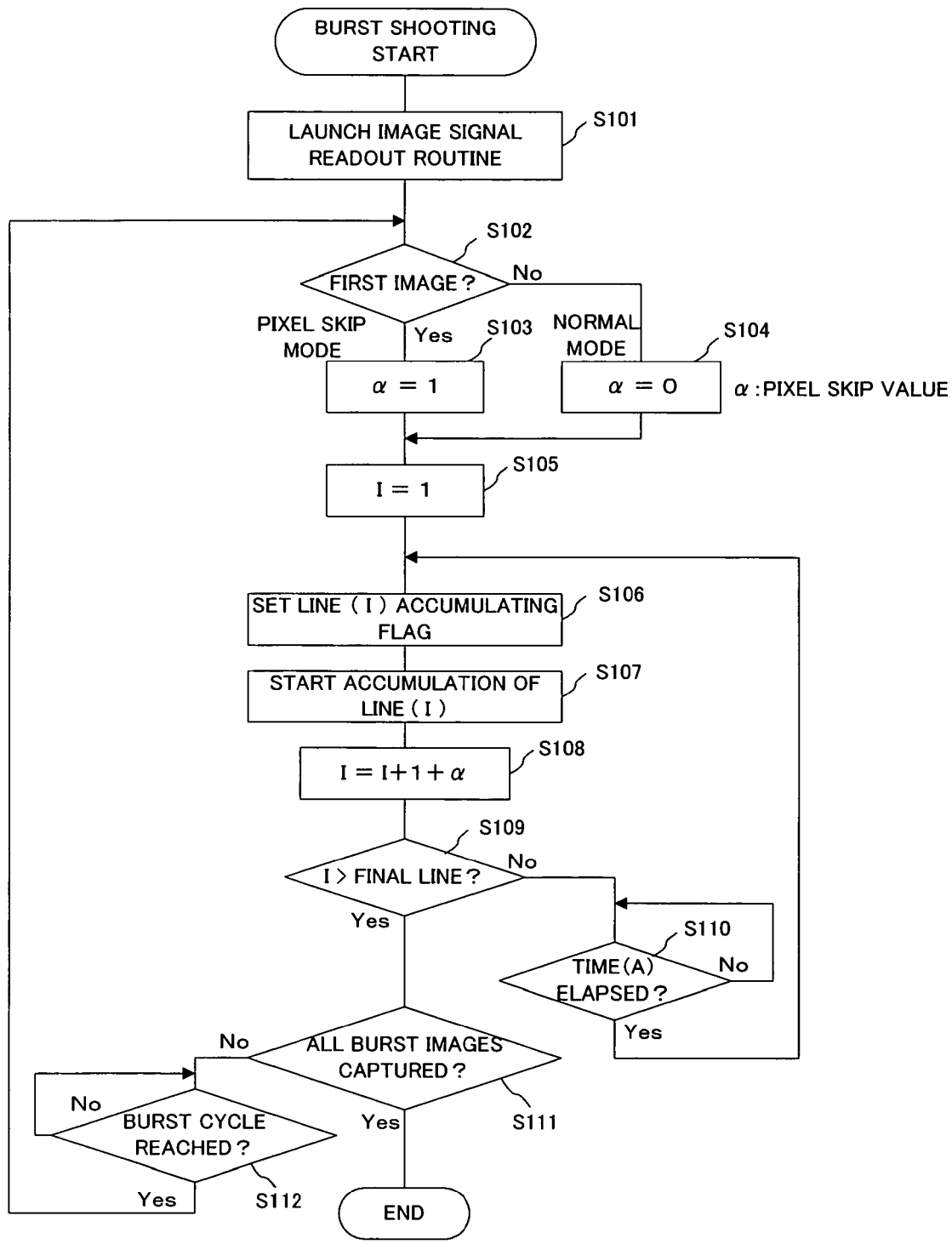
FIG. 3 is a flowchart describing an embodiment of the accumulation launch routine's process of timing generation.
Figure 4:
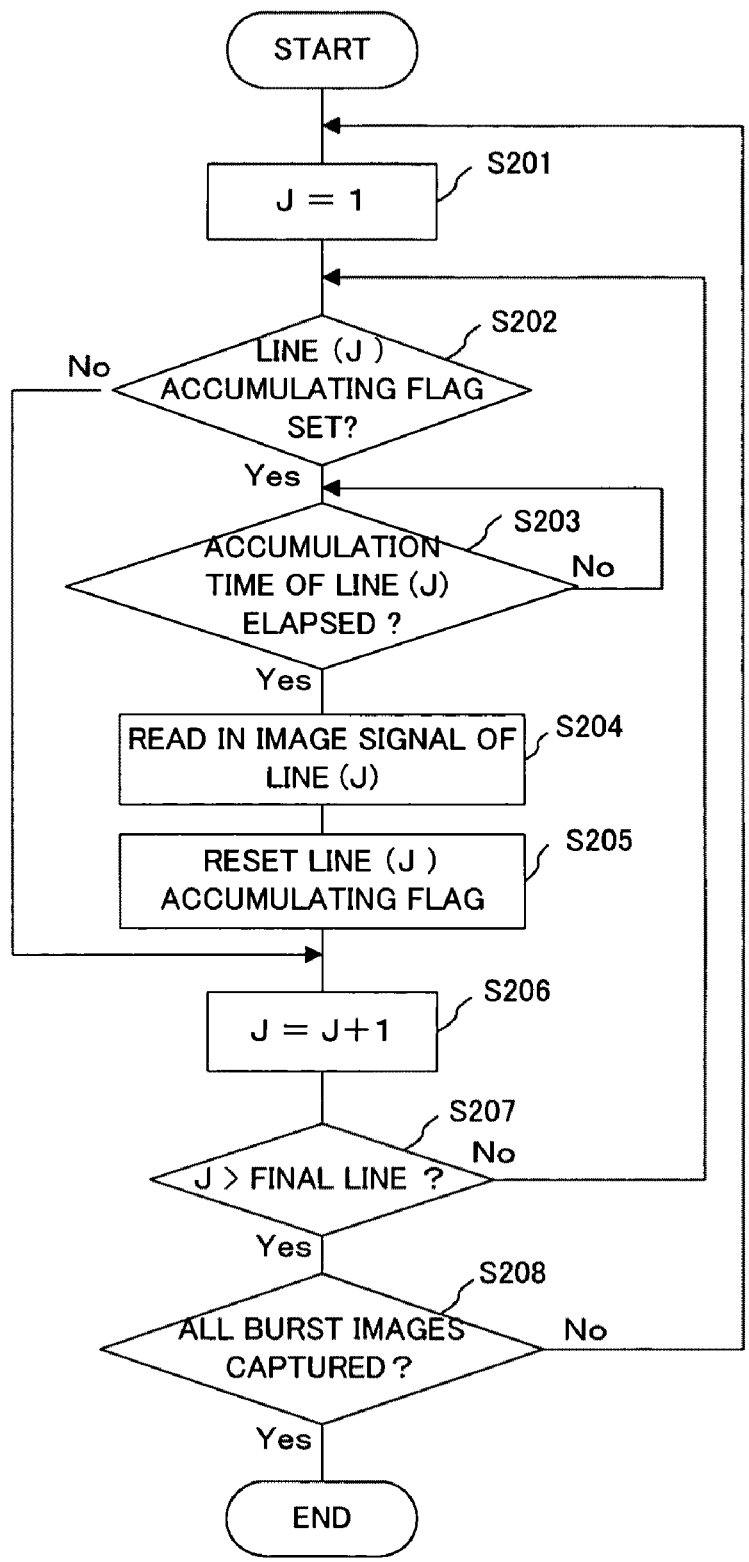
FIG. 4 is a flowchart describing an embodiment of the image signal readout routine's process of timing generation.

Next, FIG. 2 to FIG. 4 are used to describe the burst photography operation of image capturing apparatus 1 in the above architecture.

FIG. 2 is a timing chart of the timing generation unit 24. Timing generation unit 24 detects shutter operation to vertically scan groups of pixels, which are horizontal lines, in sequence; however, in this embodiment, the timing generation unit 24 generates scanning signals so that the first image captured skips every other horizontal line in the pixel skip mode, and from the second image every scan signal is sent out as the images will be captured in the normal mode without pixel skipping. And after obtaining predetermined number of N captured images, the operation terminates. This is the continuous action of a single shutter operation, which obtains one image in the pixel skip mode and N−1 images in the normal mode.

A more detailed description of the scan timing in FIG. 2 would be that scan signals are sent out for every other line (e.g. line 1, line 3, line 5, . . . ). For each line scanned, the reset signal is sent sequentially after a predetermined time (A) of exposure timing lag, and then accumulation (exposure) begins. After each line's accumulation time has elapsed, readout signal is sent out, and the line's pixel signals are read out. Then, after the final line to scan has been scanned and its pixel signals have been read out, a single image data capture has been completed. These lines' pixel signals will be read into image processing device 10 by image data input unit 11, and stored by input image data storage unit 51.

The normal mode is used from the second iteration of the scanning operation. In the normal mode every line (line 1, line 2, line 3, ...) is scanned without pixel skipping, and the image data input unit 11 reads in each line's signal, and the resulting image is stored in input image data storage unit 51.

The amount of time required in obtaining data for a single image in the pixel skip mode is less than in the normal mode since the time lag (A) for the exposure timing is the same in both modes.

FIGS. 5(a) and (b) show a pixel skip mode image and a normal mode image, respectively. The pixel skip mode image is shorter vertically than the normal mode image since some of the horizontal lines were skipped and not scanned.

Next, an embodiment of the algorithm for realizing the timing chart in FIG. 2 is described using FIG. 3 and FIG. 4. Timing generation unit 24 of this embodiment includes accumulation launch routine and image signal readout routine, where FIG. 3 is the flowchart of the accumulation launch routine, and FIG. 4 is the flowchart of the image signal readout routine.

First, the accumulation launch routine in FIG. 3 is launched by detecting shutter operation, which then launches the image signal readout routine (S101). Then, the mode is determined to be either pixel skip or normal (S102), if it is the pixel skip mode then the pixel skip value ($\alpha$) is set to a predetermined value (S103), if it is the normal mode then the pixel skip value ($\alpha$) is set to '0' (S104). FIG. 3 sets the pixel skip values according to FIG. 2 where the first image captured immediately after the shutter operation is set as the pixel skip image with a pixel skip value of '1', which indicates that every other line will be skipped during scanning.

Line parameter (I) corresponds to a pixel group that is being accumulated, initialize it to '1' (S105), then set the line (I) accumulating flag to indicate that line I is being currently accumulated (S106). Therefore, flags corresponding to each line will be set.

Next, output the reset signal to line (I), then start accumulation (exposure) from that point in time (S107). Afterwards, increment line (I) by (1+$\alpha$) (S108).

Then, determine whether line (I) has exceeded the final line (S109), if "No" then return to step S106 after a predetermined amount of time (timing chart "A" in FIG. 2), and repeat the process ("Yes" in S110).

If the final line has been exceeded in step S109, then determine whether the capture of predetermined number of burst images (N) has been completed or not (S111), if it has not ("No" in S111) then when the burst cycle has been reached (Yes" in S112) return to step S102 and repeat the process.

On the other hand, if the capture of predetermined number of burst images has been completed ("Yes" in S111), then terminate the process.

Next, FIG. 4 is used to describe the image signal readout routine process. The image signal readout routine is launched by executing step S101 of the accumulation launch routine. After its launch, it immediately initializes the readout pixel group line parameter (J) to '1' (S201). Next, the accumulation flag is used to determine whether line (J) is in the process of being accumulated (S202), if it is still accumulating then read in the image signal after the time required for the line to accumulate (exposure) (S203, S204), and then reset the accumulation flag for that line (S205).

Increment the line parameter by '1' (S206), determine whether the final line has been exceeded, and if it has not then return to step S202 and repeat the process (S207).

On the other hand, if step S202 was "No", which means that that line's accumulation flag is not set to true, then jump to step S206, and start the process of reading out the next line.

If the readout of the pixel signals of the final line has been completed at step S207, determine whether image signals for the predetermined number of burst images captured (N) has already been read out (S208), if it has not then return to step S201 and execute the readout process for the next iteration of a captured image. If the capture of predetermined number of burst images (N) has been completed at step S208, then terminate the process.

The above describes how timing generation unit 24 sends out timing signals for the accumulation and readout routines.

FIG. 3 and FIG. 4 are algorithms that generate timing by software installed in a microcontroller and so on; however, the timing chart in FIG. 2 is not restricted in terms of its implementation. For example, the accumulation timing and the readout timing can be generated in pixel skip mode and normal mode for their scan lines by delaying for a predetermined amount of time. Also, the accumulation launch timing of the next cycle can be shifted forwards in such a way that it does not overlap with the readout process of each line. Image data is read in via image data input unit 11 after image signals for all lines have been read out.

Also, with the CMOS sensor, random access of each pixel is theoretically possible, but this embodiment has been described with the assumption that pixels are accessed by line. Additional pixel skipping can also be executed on a column basis to further shorten the readout time, which will also shorten the scanning time in the pixel skip mode.

By executing the above process, N images are obtained from a single shutter operation. One image will be a reference image in the pixel skip mode, and (N−1) target images will be in the normal mode. N is an integer that is not less than 2.
(Image Size Adjustment Process)

Figure 5:
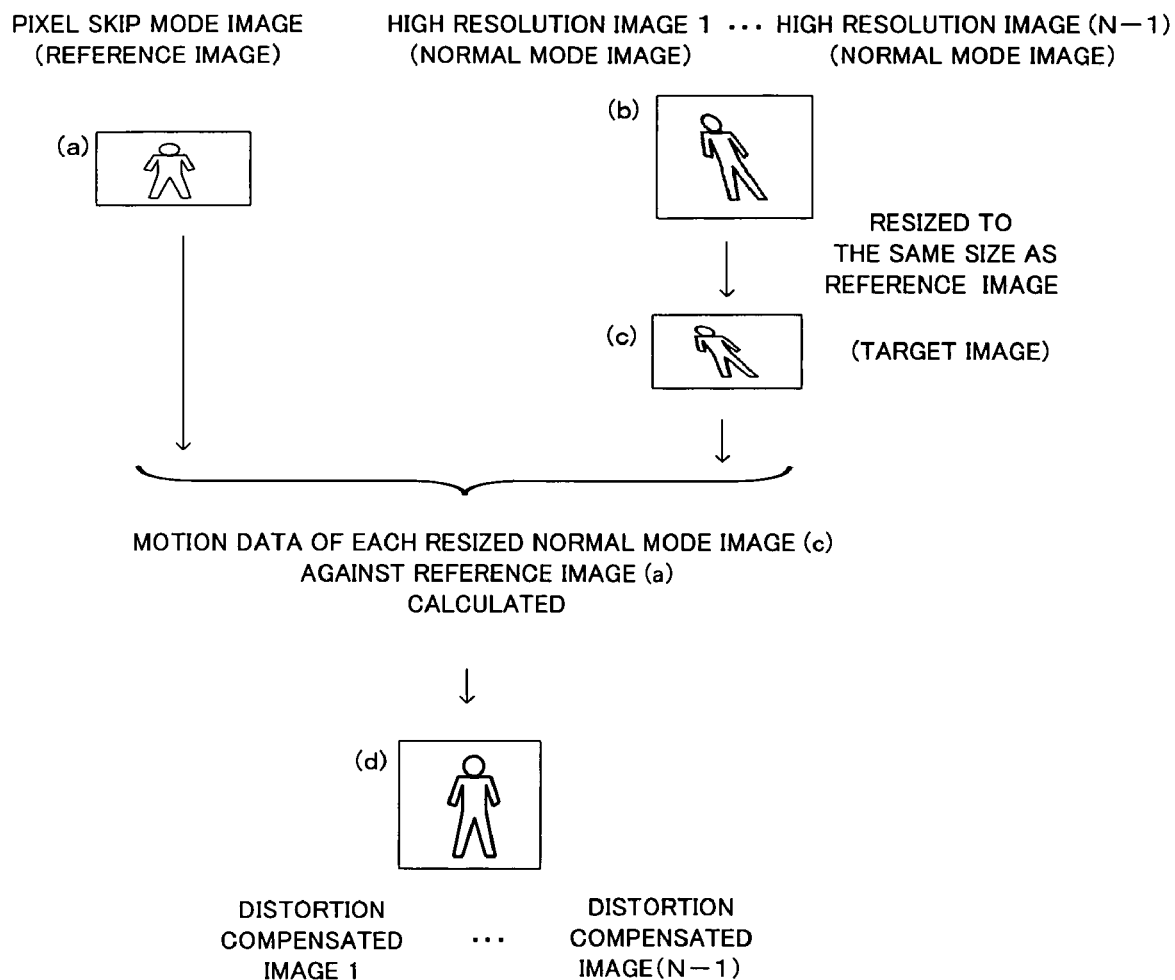
FIG. 5 is a diagram describing this embodiment's process outline of the present invention.

FIG. 5 shows the examples of images obtained via the pixel skip mode and the normal mode. Since some horizontal lines are skipped in the pixel skip mode, the image is a horizontal rectangle as indicated in FIG. 5(a). Image size adjustment unit 12 matches the size (FIG. 5(c)) of the normal mode image (FIG. 5(b)) by removing the corresponding pixels of horizontal lines that were skipped in the pixel skip mode image. At this time, as indicated by both images FIG. 5(a) and FIG. 5(c), the distortion in the normal mode image (FIG. 5(c)) is greater. This is due to the difference in exposure timing of each corresponding line.
(Motion Data Detection Process)

Next, the motion data detection unit 13 uses the pixel skipped image (FIG. 5(a)) as a reference image, and the resized normal mode images (FIG. 5(c)) as target images, and calculates the motion data of the reference image to each target image. For the motion data, it can be a motion vector indicating the parallel displacement between a reference image and a target image, or it can also be affine parameters that have more degrees of freedom in terms of such matters as image rotation. For example, Japanese Unexamined Patent Application Publication No. 2007-226643 provides a technology that can attain highly accurate affine parameters by executing a multiresolution process on an input image and then executing block matching process from the lowest resolution image to higher resolution images, this technology can be used to compute the motion data between a reference image and a target image.

Motion data is calculated after a target image has been converted to the same size as a reference image; therefore, this motion data should be converted to fit the original size of the target image.

For example, if rows (i.e. horizontal lines) of a target image data were pixel skipped and the image is 1/n in size in the 'y' direction, then multiplying the calculated motion data's 'y' direction component by 'n' will produce motion data for the original size of the target image.

Distortion compensation unit 14 uses this motion data to sequentially compensate the distortion (in other words motion against a reference image) of the normal mode images (high resolution images) 1 through (N−1) that are stored in input image data storage unit 61, and then the distortion compensated images (FIG. 5(*d*)) are passed to image synthesizing unit 15.

(Image Synthesizing Process)

Next, image synthesizing unit 15 blends the distortion compensated images together by performing generalized signal averaging. FIG. 8 shows examples of the image before and after compensation. FIG. 8(*a*) is the input image before compensation, and FIG. 8(*b*) is the compensated image output from image synthesizing unit 15.

Image data created by this process is stored in synthesized image data storage unit 52. Then, it gets output to external devices such as memory devices and printers via synthesized image output unit 16.

According to this embodiment described above, a high quality image which is compensated for both camera shake during image capturing and distortion caused in the focal plane system can be obtained from images captured by an image capturing apparatus with focal plane electronic shutter system; this is performed by using the image captured in the pixel skip mode as a reference image and the images captured in the normal mode as target images, then executing block matching processes to calculate the motion data which is then used to compensate the distortion of each target image, and then finally the target images are blended together to synthesize a high quality image.

In this embodiment described above, the pixel skip mode image is captured at the beginning of the burst image capturing, but the pixel skip mode image can be captured in the middle or end of the burst. Preferably, the pixel skip mode image should be captured where there is less impact of camera shake from the burst image capturing operation.

Also, according to this embodiment, an image capturing apparatus which can capture a high quality image with less distortion can be realized at low cost since there is no need to attach additional circuitry such as synchronized reading circuitry of image signals or gyro sensors in order to prevent distortion of captured images. Next, other embodiments of the present invention are described here.

Another Embodiment 2 of Motion Data Detection Process

Figure 6:
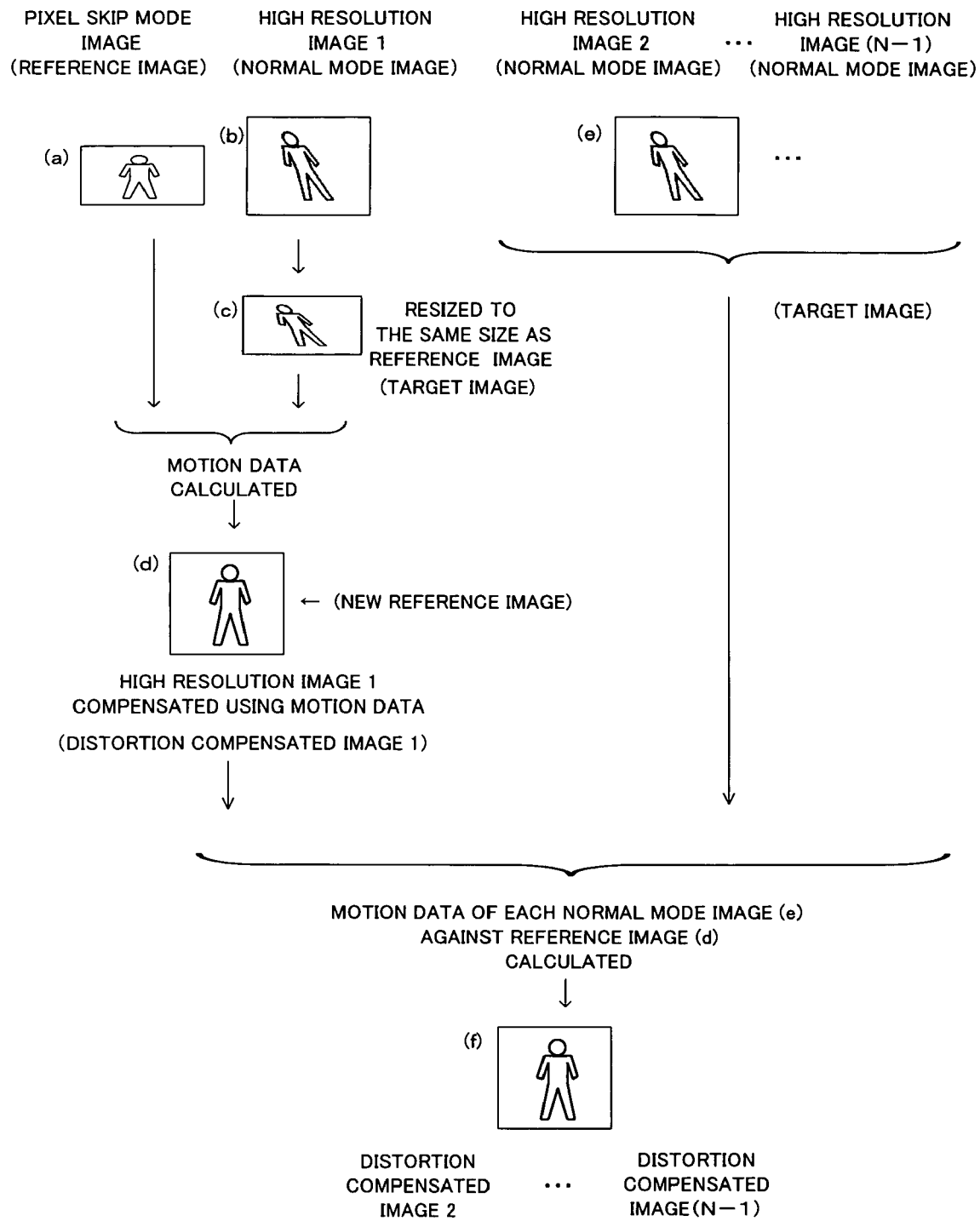
FIG. 6 is a diagram describing another embodiment's process outline of the present invention.

In the above embodiment, the pixel skip mode image is used as a reference image against which each of the normal mode images are compared to as the target images in order to compute each motion data. However, as shown in FIG. 6, the motion data can be computed using just the pixel skip mode image (FIG. 6(*a*)) and the first normal mode image (FIG. 6(*b*)), and then compensate for the distortion in the normal mode image using this motion data. Then use this distortion compensated image (FIG. 6(*d*)) as the new reference image and the other normal mode images (FIG. 6(*e*)) as the target images to compute motion data between the images by using the block matching process, and this motion data can be used to compensate the distortion of normal mode images and then execute the blending process of the images.

Another Embodiment 2 of Motion Data Detection Process

Figure 7:
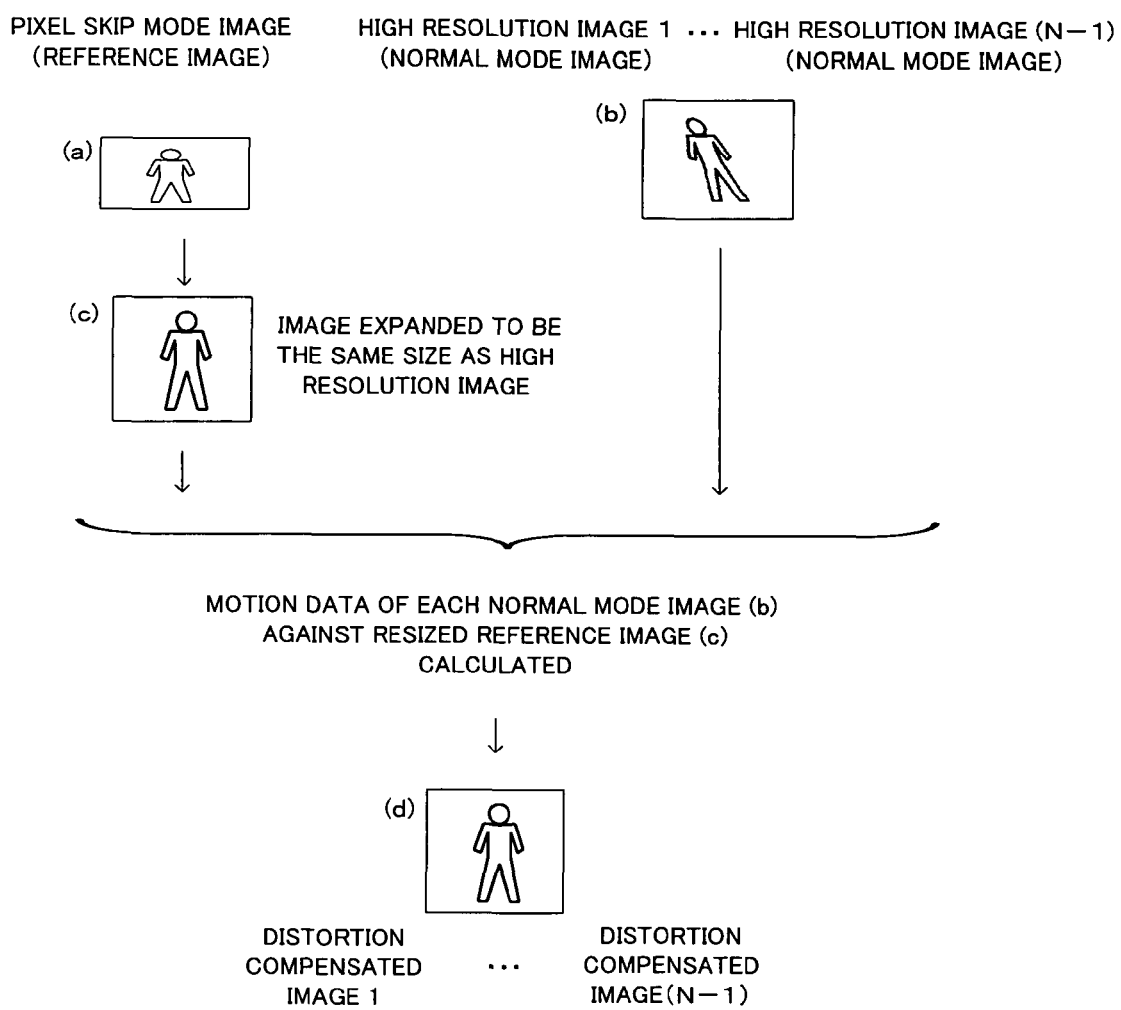
FIG. 7 is a diagram describing yet another embodiment's process outline of the present invention.

Motion data computation can be executed as shown in FIG. 7. First, interpolate the pixel skipped image by using methods such as the bilinear method or the bicubic method to resize it to be the same size as the normal mode images (FIG. 7(*c*)), and use this image as the reference image to compute the motion data between it and the normal mode images (FIG. 7(*b*)) to obtain the distortion compensated image (FIG. 7(*d*)). In this embodiment, motion data for high resolution images are calculated directly; therefore, the process to convert the motion data to the original image size becomes unnecessary.

The present invention shall not be limited to embodiments described above, and can be implemented in various forms that do not exceed the scope of the main purpose of this invention. For example, compensating the distortion in a single image captured in the normal mode can be executed by omitting the image synthesizing process.

The present invention can be used not only in image capturing apparatus such as mobile phones and digital cameras to capture still images, but can also be used to compensate distortions in I-Frames (intra coded picture frames) of videos in order to capture high quality video.

What is claimed is:

1. A method for capturing an image using an image capturing module with multiple pixels configured in a 2-dimensional matrix and a focal plane electronic shutter function which sequentially slides the exposure timing by constant interval by pixel group which is a unit of predetermined number of the pixels while scanning, comprising:
    an image data input process for detecting shutter operation, obtaining a reference image while skipping one or more of the pixel groups by sequentially sliding the exposure timing by said constant interval, and obtaining a target image while not skipping pixel groups to be captured;
    a motion data detection process for calculating the motion data of the target image based on the reference image; and
a distortion compensation process for compensating for distortion in the target image according to the motion data.

2. The method for capturing an image according to claim 1, further comprising:
    obtaining multiple target images;
    executing said motion data detection process and said distortion compensation process to each target image to obtain a distortion compensated image of each target image; and
    an image synthesizing process for synthesizing the distortion compensated images together.

3. The method for capturing an image according to claim 2, wherein said image capturing module is a CMOS sensor.

4. An image capturing apparatus with multiple pixels configured in a 2-dimensional matrix and a focal plane electronic shutter function which sequentially slides the exposure timing by constant interval by pixel group which is a unit of predetermined number of the pixels while scanning; the image capturing apparatus captures multiple image data in a single shutter operation, comprising:
    a timing generation means that has a pixel skip mode where one or more of the pixel groups are skipped while scanning by sequentially sliding the exposure timing by said constant interval and a normal mode where each group to be captured is sequentially scanned without pixel skipping; the timing generation means detects shutter operation and outputs an operation signal to an image capturing module according to each of said modes;

an image data input means for obtaining image data captured in the pixel skip mode and multiple image data captured in the normal mode from the image capturing module;

an input image data storage means for storing an image data captured in the pixel skip mode as reference image and image data captured in the normal mode as target images;

a size adjustment means for matching the sizes of the reference image and the target images;

a motion data detection means for calculating the motion data between the reference image and each of the multiple target images by executing a block matching process using the reference image and the target images output from the size adjustment means;

a distortion compensation means for compensate distortion in each target image stored in the input data storage means according to the motion data detected by said motion data detection means; and an image synthesizing means for creating an synthesized image by synthesizing images output from the distortion compensation means.

* * * * *